(12) United States Patent
Barczak

(10) Patent No.: US 10,782,904 B2
(45) Date of Patent: Sep. 22, 2020

(54) HOST COMPUTING ARRANGEMENT, REMOTE SERVER ARRANGEMENT, STORAGE SYSTEM AND METHODS THEREOF

(71) Applicant: Intel Corporation, Santa Clara, CA (US)

(72) Inventor: Mariusz Barczak, Gdansk (PL)

(73) Assignee: INTEL CORPORATION, Santa Clara, CA (US)

( * ) Notice: Subject to any disclaimer, the term of this patent is extended or adjusted under 35 U.S.C. 154(b) by 120 days.

(21) Appl. No.: 15/718,032

(22) Filed: Sep. 28, 2017

(65) Prior Publication Data

US 2019/0095336 A1 Mar. 28, 2019

(51) Int. Cl.
*G06F 3/06* (2006.01)
*G06F 16/172* (2019.01)
(Continued)

(52) U.S. Cl.
CPC ............ *G06F 3/0635* (2013.01); *G06F 3/061* (2013.01); *G06F 3/065* (2013.01); *G06F 3/0611* (2013.01); *G06F 3/0613* (2013.01); *G06F 3/0619* (2013.01); *G06F 3/0665* (2013.01); *G06F 3/0685* (2013.01); *G06F 9/45545* (2013.01); *G06F 9/45558* (2013.01); *G06F 12/0868* (2013.01); *G06F 16/172* (2019.01); *G06F 16/182* (2019.01); *G06F 16/1844* (2019.01);
(Continued)

(58) Field of Classification Search
CPC .............. G06F 12/0868; G06F 16/182; G06F 16/1844; G06F 16/172; G06F 3/0619; G06F 3/065; G06F 3/0665; G06F 9/45545; G06F 9/45558; G06F 2009/45579; G06F 2009/45583; G06F 2009/45591; G06F 2212/604; G06F 3/061; G06F 3/0611; G06F 3/0613; G06F 3/0635; G06F 3/0685; H04L 67/1095
See application file for complete search history.

(56) References Cited

U.S. PATENT DOCUMENTS 7,899,791 B1 * 3/2011 Gole ................... G06F 12/0804
707/654
8,135,763 B1 * 3/2012 Compton .............. G06F 16/122
707/822
(Continued)

OTHER PUBLICATIONS

Toms Hardware; The X25E Enterprise SSD Intel's X25-E SSD Walks All Over the Competition 2009 (Year: 2009).*
(Continued)

*Primary Examiner* — Paul M Knight
(74) *Attorney, Agent, or Firm* — Viering, Jentschura & Partner MBB

(57) ABSTRACT

A host computing arrangement is provided, which may include a host processor having a host operating system and host kernel associated therewith. The host processor may be configured to host a guest operating system, mirror a filesystem of the guest operating system via the host kernel, and generate caching criteria by scanning the mirrored filesystem. The host computing arrangement may further include a cache engine. The cache engine may be configured to process an I/O request from the guest operating system based on the caching criteria generated by the host processor.

18 Claims, 7 Drawing Sheets

(51) Int. Cl.
*H04L 29/08* (2006.01)
*G06F 16/182* (2019.01)
*G06F 9/455* (2018.01)
*G06F 12/0868* (2016.01)

(52) U.S. Cl.
CPC ............... *H04L 67/1095* (2013.01); *G06F 2009/45579* (2013.01); *G06F 2009/45583* (2013.01); *G06F 2009/45591* (2013.01); *G06F 2212/604* (2013.01)

(56) References Cited

U.S. PATENT DOCUMENTS

| | | | | |
|---|---|---|---|---|
| 8,301,602 | B1* | 10/2012 | Jiang | G06F 16/17 707/649 |
| 8,595,271 | B1* | 11/2013 | Patwardhan | G06F 16/11 707/821 |
| 9,760,574 | B1* | 9/2017 | Zhai | G06F 16/16 |
| 10,146,788 | B1* | 12/2018 | Weatherall | G06F 16/178 |
| 10,203,951 | B2* | 2/2019 | Song | G06F 3/0619 |
| 2001/0023436 | A1* | 9/2001 | Srinivasan | G11B 27/031 709/219 |
| 2004/0267830 | A1* | 12/2004 | Wong | H04L 29/06 |
| 2004/0267838 | A1* | 12/2004 | Curran | G06F 11/1451 |
| 2006/0036775 | A1* | 2/2006 | Levit-Gurevich | G06F 9/45537 710/1 |
| 2006/0137013 | A1* | 6/2006 | Lok | G06F 21/80 726/24 |
| 2013/0332646 | A1* | 12/2013 | Benhase | G06F 12/0804 711/103 |
| 2017/0060702 | A1* | 3/2017 | Dave | G06F 16/184 |

OTHER PUBLICATIONS

Differentiated Storage Services; by Messnier 2011 (Year: 2011).*
Flash in a DBMS Where and How; by Athanassoulis 2010 (Year: 2010).*
TechRepublic Non Standard RAID Levels Primer RAID 1E; by Lowe 2007 (Year: 2007).*
Linux Filesystem Hierarchy Chapter 1 Linux Filessytem Hierarchy Sep. 2016 (Year: 2016).*
DigitalOcean; How to Manage RAID Arrays with mdadm on Ubuntu 2016 (Year: 2016).*
Solid State Drive Caching Differentiated Storage Services by Black 2009 (Year: 2009).*
BitTech Intel X25-E 32GB SSD 2008 (Year: 2008).*
How to Configure RAID in Linux by Dedoimedo (Year: 2009).*
SmartScan: Efficient Metadata Crawl for Storage Management Metadata Querying in Large File Systems by Liu; Carnegie Mellon University (Year: 2010).*

* cited by examiner

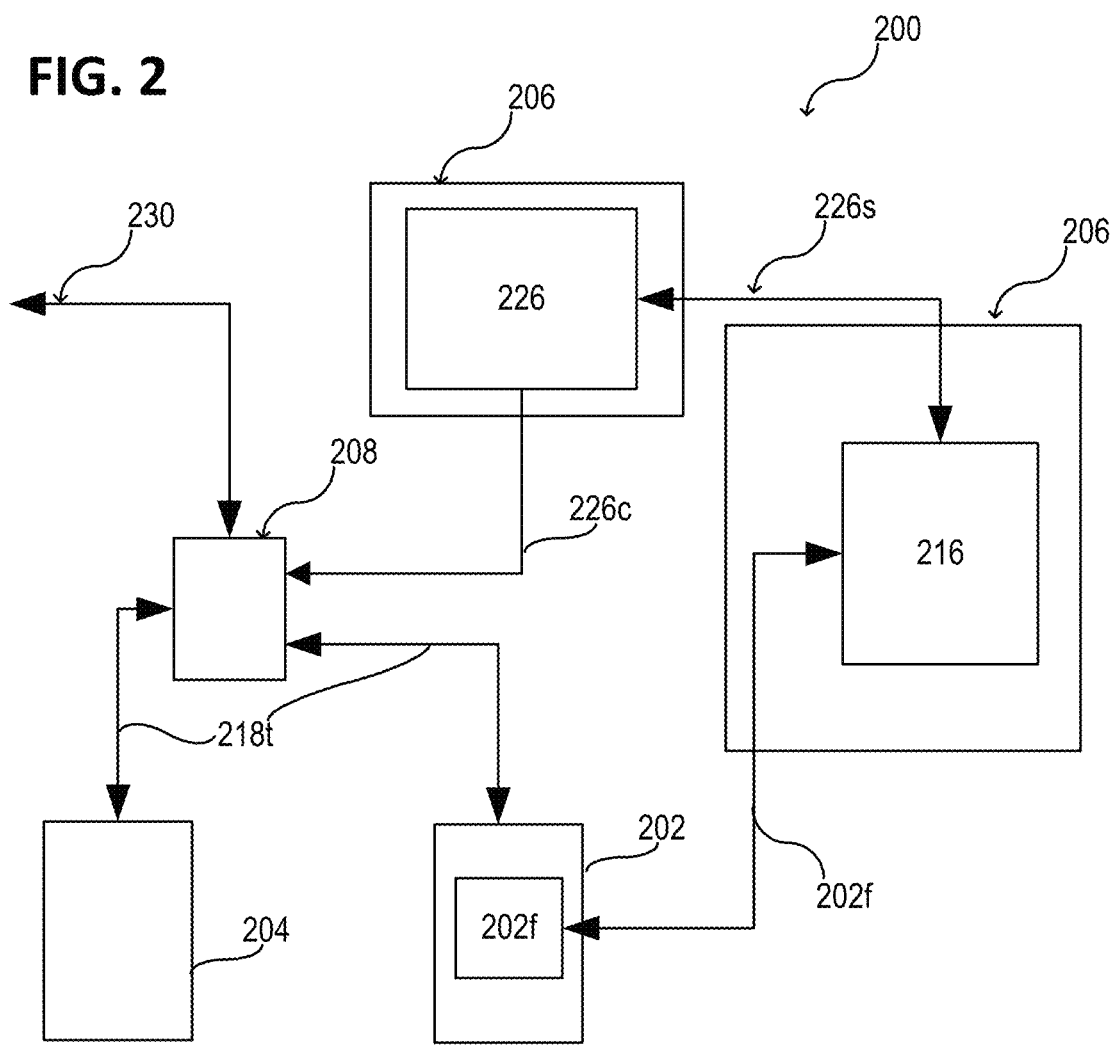

HOST COMPUTING ARRANGEMENT, REMOTE SERVER ARRANGEMENT, STORAGE SYSTEM AND METHODS THEREOF

TECHNICAL FIELD

Various aspects relate generally to a host computing arrangement, a remote server arrangement, a storage system, and a method for operating a storage system.

BACKGROUND

Efficient data management techniques may become more and more important as data volume and data traffic increases in storage architectures. In some applications, data may be stored remotely at a storage system spaced apart from the actual user of the data. Data transfer between a remote storage system and a client system may be based on a communication protocol. In other applications, a virtual machine monitor may be used to host various guest operating systems within a host system. A guest operating system may access one or more storage devices that are provided by the host system or that are communicatively coupled to the host system.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which:

FIG. 2 shows a storage system architecture according to some aspects of this disclosure;

DESCRIPTION

Figure 1A:
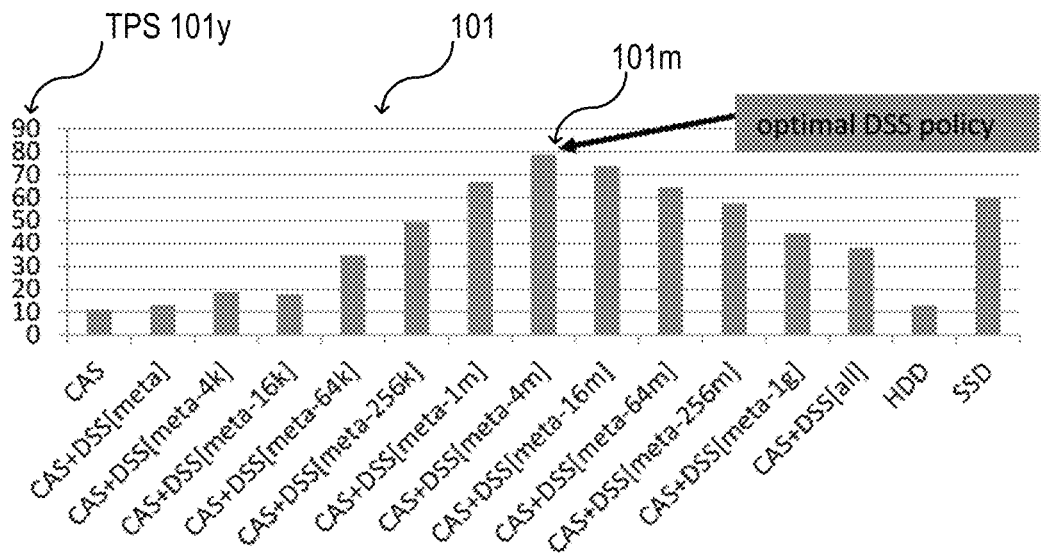
FIGS. 1A and 1B respectively show an exemplary filesystem benchmark for differentiated storage services techniques.

The following detailed description refers to the accompanying drawings that show, by way of illustration, specific details and embodiments in which the disclosure may be practiced.

The word "exemplary" is used herein to mean "serving as an example, instance, or illustration". Any embodiment or design described herein as "exemplary" is not necessarily to be construed as preferred or advantageous over other embodiments or designs.

Throughout the drawings, it should be noted that like reference numbers are used to depict the same or similar elements, features, and structures.

One or more aspects are described in sufficient detail to enable those skilled in the art to practice the disclosure. Other aspects may be utilized and structural, logical, and/or electrical changes may be made without departing from the scope of the disclosure.

The various aspects of the disclosure are not necessarily mutually exclusive, as some aspects can be combined with one or more other aspects to form new aspects.

Various aspects are described in connection with methods and various aspects are described in connection with devices. However, it may be understood that aspects described in connection with methods may similarly apply to the devices, and vice versa.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g., "a plurality of [objects]," "multiple [objects]") referring to a quantity of objects expressly refers more than one of the said objects. The terms "group (of)," "set [of]," "collection (of)," "series (of)," "sequence (of)," "grouping (of)," etc., and the like in the description and in the claims, if any, refer to a quantity equal to or greater than one, i.e. one or more.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The terms "processor" or "controller" as, for example, used herein may be understood as any kind of entity that allows handling data. The data may be handled according to one or more specific functions executed by the processor or controller. Further, a processor or controller as used herein may be understood as any kind of circuit, e.g., any kind of analog or digital circuit. The term "handle" or "handling" as for example used herein referring to data handling, file handling or request handling may be understood as any kind of operation, e.g., an I/O operation, or any kind of logic operation. An I/O operation may be, for example, storing (also referred to as writing) and reading.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

Differences between software and hardware implemented data handling may blur. A processor, controller, and/or circuit detailed herein may be implemented in software, hardware and/or as hybrid implementation including software and hardware.

The term "system" (e.g., a storage system, a server system, client system, guest system etc.) detailed herein may be understood as a set of interacting elements, wherein the elements can be, by way of example and not of limitation, one or more mechanical components, one or more electrical components, one or more instructions (e.g., encoded in storage media), and/or one or more processors, and the like.

The term "storage" (e.g., a storage device, a primary storage, etc.) detailed herein may be understood to include any suitable type of memory or memory device, e.g., a hard disk drive (HDD), and the like.

The term "cache storage" (e.g., a cache storage device) or "cache memory" detailed herein may be understood to include any suitable type of fast accessible memory or memory device, a solid-state drive (SSD), and the like. According to various embodiments, a cache storage device or a cache memory may be a special type of storage device or memory with a high I/O performance (e.g., a great read/write speed, a low latency, etc.). In general, a cache device may have a higher I/O performance as a primary storage, wherein the primary storage may be in general more cost efficient with respect to the storage space. According to some aspects, a storage device may include both a cache memory and a primary memory. According to some aspects, a storage device may include a controller for distributing the data to the cache memory and a primary memory. According to various embodiments, a storage volume of the primary memory may be greater than a storage volume of the cache memory. According to various embodiments, a storage volume of the primary storage may be greater than a storage volume of the cache storage device.

As used herein, the term "memory", "memory device", and the like may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™), etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

A volatile memory may be a storage medium that requires power to maintain the state of data stored by the medium. Non-limiting examples of volatile memory may include various types of RAM, such as dynamic random access memory (DRAM) or static random access memory (SRAM). One particular type of DRAM that may be used in a memory module is synchronous dynamic random access memory (SDRAM). In some aspects, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Various aspects may be applied to any memory device that includes non-volatile memory. In one aspect, the memory device is a block addressable memory device, such as those based on negative-AND (NAND) logic or negative-OR (NOR) logic technologies. A memory may also include future generation nonvolatile devices, such as a 3D XPoint™ memory device, or other byte addressable write-in-place nonvolatile memory devices. A 3D XPoint™ memory may include a transistor-less stackable cross-point architecture in which memory cells sit at the intersection of word lines and bit lines and are individually addressable and in which bit storage is based on a change in bulk resistance.

In some aspects, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magneto resistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The terms memory or memory device may refer to the die itself and/or to a packaged memory product.

According to some aspects, a computing system (e.g., a host computing system or a host computing arrangement; a remote server system or a remote server arrangement) may implement one or more cache policies to efficiently cache most important data and avoid eviction of these data by less important data (for example, filesystem metadata may have a higher priority, e.g. defined as more important, than filesystem data).

According to some aspects, a Differentiated Storage Services (DSS) technique may be implemented in the computing system. This technique may improve storage performance by reducing I/O latency and/or response time and increasing throughput and/or bandwidth. Differentiated Storage Services may relate to a classification, wherein I/O operations are assigned to one or more classes. Based on this classification, policies may be associated with the classes (e.g., a filesystem data of a filesystem may require high performance I/Os). The storage system may be configured to handle data according to the one or more policies (e.g., a cache storage device may be used to provide low latency for filesystem data I/Os). This technique to gain performance values can be implemented for example in a software, e.g., Intel Cache Acceleration Software-CAS, executed on a host computing arrangement or on a remote storage arrangement.

Caching may be applied for one or more block devices. A block device may include raw data and a filesystem that provides, for example, a logical tree view of the raw data to a user. The user may only handle the user data, e.g., the name and content of the files. The filesystem implementation may use additional raw data associated therewith; the additional raw data may be stored on the block device only for implementing the filesystem. Therefore, a user workload may be a mixture of filesystem data (user data) and filesystem metadata (e.g., data used for the filesystem). According to various embodiments, filesystem metadata may have the highest caching priority. Filesystem data may have a lower priority, e.g., dependent from their file size, e.g., files with a smaller file size (e.g., 4 kb) may have a higher caching priority than files with a greater file size (e.g., 1 Mb). However, according to various embodiments, the priority of the specific type of data may be predefined, e.g., user-defined, as desired.

According to various aspects, filesystem data may be referred to as user data stored in files. Filesystem metadata may be owned by a filesystem to track layout, file and directory placement, attributes, etc.

According to some aspects, a classification of data, e.g., the filesystem data, filesystem metadata, etc., may be provided to increase I/O performance. This applies for example in CAS, which may use an I/O classification in order to provide efficient caching for storage devices in software-defined storage systems (SDS, a storage platform implementing object storage on a single distributed computer cluster, and provides interfaces for object-, block- and file-level storage) like Ceph or OpenStack SWIFT.

FIG. 1A illustrates a filesystem benchmark 101, for various cache strategies, according to various embodiments. The filesystem benchmark 101 may be applied with Postmark running on a Lustre filesystem with a SPECsfs benchmark distribution. The filesystem benchmark 101 may be performed for a CAS implementation compared to HDD and SSD performance and compared to a CAS implementation combined with DSS up to a specific file size, e.g., only metadata, metadata and files from to 4 kB to 1 GB, and metadata and all files (as depicted on the horizontal axis). As illustrated, the TPS (transactions per second) performance 101y (depicted at the vertical axis) is increased for the case that both CAS and DSS are implemented, wherein the TPS performance 101y has a maximum 101m for caching metadata and files up to 4 MB.

Figure 1B:
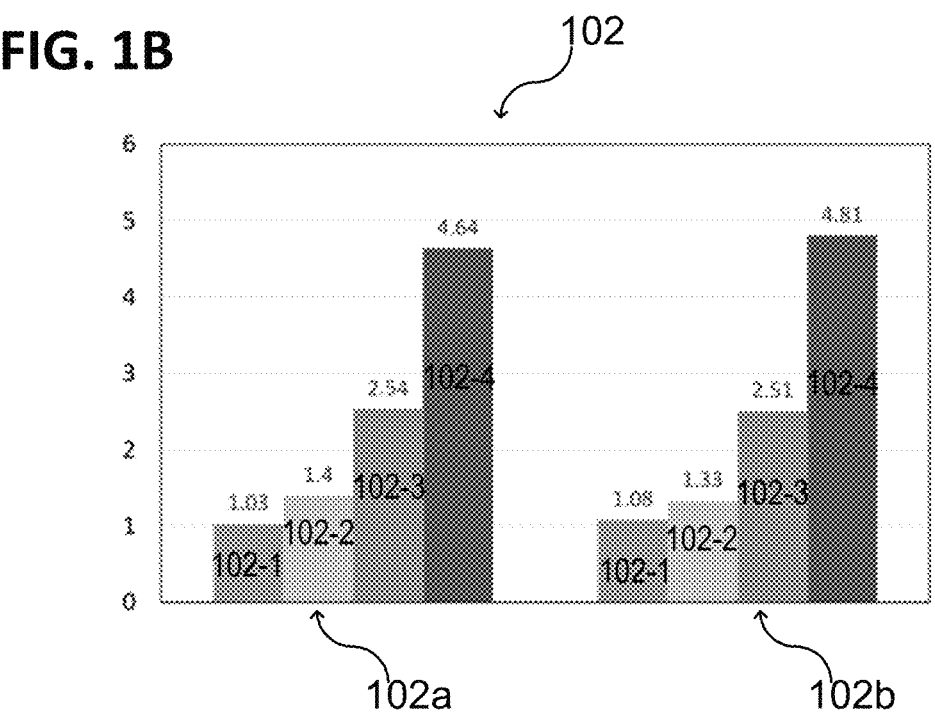

FIG. 1B illustrates the relative speedup 102 (depicted on the vertical axis) normalized to an HDD speed for a two different Ceph configurations and various cache strategies (depicted on the horizontal axis). The first Ceph configuration 102a illustrated in FIG. 1B includes one virtual machine (VM), one object storage daemon (OSD) and one replica. The second Ceph configuration 102b illustrated in FIG. 1B includes one virtual machine (VM), three object storage daemons (OSD) and three replicas. For each of the Ceph configurations 102a, 102b, the relative speedup 102 is shown for various cache strategies. The illustrative cache strategies may include, e.g., an LRU (Last Recently Used) Write-Through 102-1, a DSS (Differentiated Storage Services) Write-Through 102-2, an LRU Write-Back 102-3, and a DSS Write-Back 102-4.

As illustrated in FIG. 1A and FIG. 1B, the DSS cache strategy may allow an efficient caching of data that may be used in computing systems according to some aspects. However, a storage stack and/or transport APIs may not have the possibility to embed I/O hints into an I/O request. In other words, the I/O request may be transmitted (e.g., sent and/or received) without a classification criterion (e.g., a classification tag) that allows the handling of the I/O request according to various classes assigned with the classification criterion. In such a case, an I/O classification based on embedded I/O hints may not be performed. Accordingly, a backend storage system may not be able to adopt the DSS technique, nor can the aforementioned improvements associated therewith be realized.

According to some aspects, a cache engine (also referred to as a cache processor, e.g., a CAS with implemented DSS logic) may be implemented in a computing system (e.g., a storage system) that provides raw I/Os (e.g., unclassified I/Os, also referred to as I/Os without embedded hints) to the cache engine, so that the cache engine is, for example, not able to distinguish filesystem metadata and other data from each other. In some aspects, a storage virtualization may be implemented as a hypervisor based on a Quick Emulator (QEMU). The term hypervisor may be referred to as a virtual machine monitor (VMM)). A guest system operated via the hypervisor may not be able to provide hinted I/Os to a cache engine of the hypervisor. As another example, a remote attached storage, communicating via iSCSI, may not be able to provide hinted I/Os from a filesystem logic provided on a computing node to the remote storage node running the cache engine, since in this case the cache engine one the remote storage node receive only raw I/Os (i.e., I/Os without embedded hint for caching).

In general, it may be possible to modify the whole storage stack and to adjust the used software in order to transport I/O hints from the point where the I/O is generated to the backend storage. This possible DSS evolution may be delayed since a transition to new version of software and specification (e.g., SCSI) has a long time to market. In case of a virtualization, also a guest operating system (guest OS) needs to be updated. However, if a user wants to use an older guest OS version, the I/O hints may be not generated and/or not transmitted. In these cases, a DSS and CAS technique cannot be applied on the transmitted I/Os, nor can the aforementioned improvements associated therewith be realized.

Further, analyzing of I/O meaning and hinting the I/O may be carried out on the fly. However, this may be a complex task and would require understanding the layout of various filesystems. Therefore, a huge software amount, complexity, sustainability issues, etc. may arise with such an on-the-fly implementation, which may be avoided, as described, for example, herein.

According to some aspects, a computing system and a method for operating the same may be provided to distinguish filesystems data from filesystem metadata on the host side or on the remote storage side without any modifications of existing storage software and transport layers.

According to some aspects, a filesystem implementation may be used for hinting I/Os, where the filesystem implementation is available in the kernel on the host side or on the remote storage side. According to some aspects, a filesystem metadata detection is performed in a background thread out of an application flow. In other words, the filesystem metadata detection may, for example, not affect a guest OS of a host computing system or a compute node of a remote storage system.

According to some aspects, a thread may be executed by the respective processor of the computing system, where the thread is related to a filesystem metadata detection. This thread is also referred to herein as filesystem (FS) scanner. The filesystem scanner may be implemented in hardware, software or as a hybrid implementation including both hardware and software.

Some aspects are related to an implementation of a filesystem scanner in a host computing system that includes a hypervisor (such as a QEMU) or any other suitable virtualization or emulation environment. However, the filesystem scanner may be implemented in any other storage system for generating I/O hints in the case that these hints may be not embedded on the I/O request itself.

As described in more detail in the following, a mirror block device (which may, for example, reflect to the primary storage) may be created in the kernel of the host operating system. The mirror block device may be configured to mirror a storage device (e.g., a primary storage). According to some aspects, the filesystem scanner and the host operating system may be configured to mount the mirror of the storage device in read-only mode. The kernel of the host operating system may be configured to detect the filesystem type on the mirror block device by reading for example the superblock of the filesystem. This may cause one or more I/O requests that may be forwarded to the filesystem scanner and, e.g., subsequently, to the primary storage. I/O requests containing metadata may be returned from primary storage back to kernel. Once the filesystem is mounted, the filesystem scanner may read recursively the filesystem tree and/or the files status (or any other desired data of the filesystem that are to be classified). Reading the filesystem tree may generate metadata I/Os, where each I/O request from the filesystem scanner to the primary storage may be classified as filesystem metadata I/O. This allows, for example, classifying the I/O requests (also referred to as hinting the I/Os) using the filesystem scanner, e.g., based on the reading of the filesystem of the mirror block device by the filesystem scanner. This scanning may be repeated after a predefined time (e.g., in a predefined time interval) in order to detect and classify new filesystem metadata, or, in other words, in order to refresh the classification of the filesystem metadata.

FIG. 2 illustrates a storage system 200 in a schematic view according to some aspects. The storage system 200 may include a storage device 202, a cache storage device 204, and a cache processor 208. The storage device 202 may include, for example, one or more hard disk drives (HDD). The cache storage device 204 may include, for example, one or more solid-state drives (SSD). Cache processor 208 may be configured to distribute data to the storage device 202 and to the cache storage device 204. According to some aspects, the storage system 200 may further include a processor 206. According to some aspects, the cache processor 208 may be implemented in software executed, for example, by the processor 206.

According to some aspects, the processor 206 may be configured to provide a filesystem scanner 226 and a mirror (cf. reference sign 216) of the storage device 202. The mirror of the storage device 202 may be configured to provide data from the storage device 202 to the filesystem scanner 226. In some aspects, the mirror of the storage device 202 may be configured to mirror data from the storage device 202 and not from the cache storage device 204.

According to some aspects, the processor 206 of the storage system 200 may be configured to detect the filesystem type of a filesystem 202f provided on the storage device and to mount a mirror of the filesystem to allow the filesystem scanner 226 reading data from the filesystem 202f, e.g., to read the filesystem 202f or filesystem metadata 202f of the storage device 202.

According to some aspects, the filesystem scanner 226 may be configured to scan (e.g., to read) 226s the mounted mirror of the filesystem 202f and to generate one or more classification tags 226c corresponding to mirrored data from the filesystem 202f.

According to some aspects, the cache processor 208 may be configured to receive data to be stored 230. The received data to be stored 230 are also referred to herein as a request 230 (for example as an I/O request 230) or as a file to be stored 230. As described above, the received data to be stored 230 may be raw data without embedded hints for caching. Therefore, according to some aspects, the cache processor 208 may be configured to determine a presence (and accordingly an absence, if no presence is detected) of a corresponding generated classification tag 226c for the received data 230. In a similar way, the cache processor 208 may be configured to determine a presence information of a corresponding generated classification tag 226c for the received data 230. In some aspects, presence information may include a presence of a corresponding generated classification tag. In some aspects, presence information may include an absence of a corresponding generated classification tag. In some aspects, cache processor 208 may be configured to distribute 218t the received data 230 to the storage device 202 or to the cache storage device 204 such that received data 230 without a corresponding classification tag (i.e. in the case that no presence of a corresponding generated classification tag 226c for the received data 230 is determined by the cache processor 208) are stored in the storage device 202. In the other case (i.e. in the case that a presence of a corresponding generated classification tag 226c for the received data 230 is determined by the cache processor 208), received data with a corresponding classification tag 226c are stored in the storage device 202 and/or in the cache storage device 204 according to the corresponding classification tag 226c.

Illustratively, the cache processor 208 provides one or more cache policies that define rules to determine whether the request 230 (e.g., an I/O request) can be satisfied using a cached copy of the requested data or file (e.g., using the cache storage device 204). If this is not the case, the request 230 is satisfied using the storage device 202. Since, according to some aspects, the request 230 is received without a classification tag (also referred to as hint) related to the respective one or more cache policies, the filesystem scanner 226 may be used to provide one or more classification tags 226c, e.g., as a lookup table, that allows a classification of the request 230. Upon receiving a specific request 230, the cache processor 208 may be configured to check whether a classification tag 226c corresponding to the specific request 230 (also referred to as corresponding generated classification tag) is provided by the filesystem scanner 226, and if this is the case, the request 230 can be handle according to the one or more cache policies based on the corresponding classification tag.

In other words, as illustrated in FIG. 2, the processor 206 may be configured to provide a filesystem 202f of the storage device 202 to the filesystem scanner 226 via a mirror structure 216 mirroring the storage device 202. The filesystem scanner 226 may be configured to generate a classification 226c for data of the filesystem 202f, the data of the filesystem 202f being provided to the filesystem scanner 226 via the mirror structure 216. The cache processor 208 may be configured to receive a request 230 having data associated therewith and to determine a presence or absence of a corresponding classification for the data associated with the received request 230 based on the classification 226c for the data of the filesystem 202f generated by the filesystem scanner 226. The cache processor 208 may be further configured to distribute the data associated with the received request 230 to the storage device 202 and/or to the cache storage device 204. In this case, the cache processor 208 may be configured to distribute the data associated with the received request 230 such that data associated with the received request 230 without a corresponding classification 226c are distributed 218t to the storage device 202. Further, the cache processor 208 may be configured to distribute the data associated with the received request 230 such that data associated with the received request 230 with a corresponding classification 226c are distributed 218t to the storage device 202 or to the cache storage device 204 according to the corresponding classification 226c.

According to some aspects, a host computing arrangement may include a host processor 206 and a cache processor 208 (also referred to as cache engine) as for example illustrated in FIG. 2. The host computing arrangement may be part of a host computing system, the host computing system including the host computing arrangement and a storage device 202 and a cache storage device 204 communicatively coupled to the host computing arrangement. The host processor 206 of the host computing arrangement may execute a host operating system and a host kernel associated therewith, and, the host processor 206 may be configured to host a guest operating system, to mirror a filesystem of the guest operating system via the host kernel (cf. reference sign 216), and to generate caching criteria (see reference sign 226c) by scanning (see reference sign 226s) the mirrored filesystem. The cache processor 208 may be configured to process an I/O request (see reference sign 230) from the guest operating system based on the caching criteria generated by the host processor 206.

According to some aspects, a remote server arrangement may include a remote server processor 206 and a cache processor 208 (also referred to as cache engine) as for example illustrated in FIG. 2. The remote server arrangement may be part of a remote server system, the remote server system including the remote server arrangement and a storage device 202 and a cache storage device 204 communicatively coupled to the remote server arrangement. The remote server processor 206 of the remote server arrangement may execute a remote server operating system and a remote server kernel associated therewith, and, the remote server processor 206 may be configured to communicate (e.g., via a network connection) with a client operating system, to mirror a filesystem of the client operating system via the remote server kernel (cf. reference sign 216). Caching criteria (see reference sign 226c) may be generated by scanning (see reference sign 226s) the mirrored filesystem. The cache processor 208 may be configured to process an I/O request (see reference sign 230) from the client operating system based on the caching criteria generated by the remote server processor 206. For a remote server arrangement, the mirror may be implemented on the remote side. The mirror may fetch data from the primary storage. The primary storage may be located on the same machine, wherein data could be fetched directly (i.e. with an additional network) from the primary storage. In the case that the primary storage is disaggregated (for example, the primary storage may be located on various machines), the mirror fetch the data over network communication. According to various embodiments, the mirror may not receive data from the client side.

Figure 3:
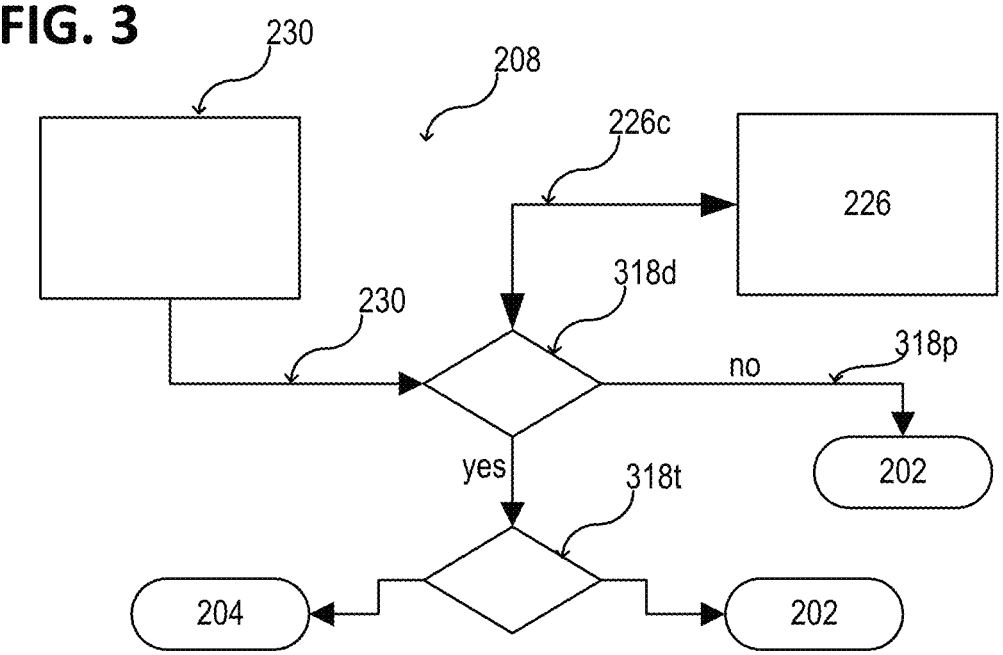
FIG. 3 shows a cache processor according to some aspects of this disclosure.

FIG. 3 illustrates a schematic view of the cache processor 208, according to some aspects. As described above, the cache processor 208 may be part of a storage system 200, e.g., of a host computing system or of a remote server system. The cache processor 208 may be configured to distribute data to various storage devices, e.g., to the storage device 202 and to the cache storage device. According to some aspects, the filesystem scanner 226 may be used to generate a classification 226c (e.g., in form of a lookup table, or in any other suitable form) by analyzing the storage device 202 (e.g., the filesystem of the storage device), as described herein. The classification 226c may include a plurality of requests associated with hints related to a cache policy for the plurality of requests. The cache processor 208 is configured to check 318d for each of the received requests 230 whether the received request 230 is classified 226c (e.g., whether the lookup table has an entry for the received request 230) and, if this is the case, to handle 318t the received request 230 according to the cache policy defined for this request 230. In the case that the received request 230 is not classified, e.g., if no entry for the received request 230 is available in the lookup table 326, the received request 230 is handled 318p according to a predefined handling scheme, e.g., in this case the received request 230 may be passed to (e.g., stored in) the storage device 202 without changes.

Figure 4:
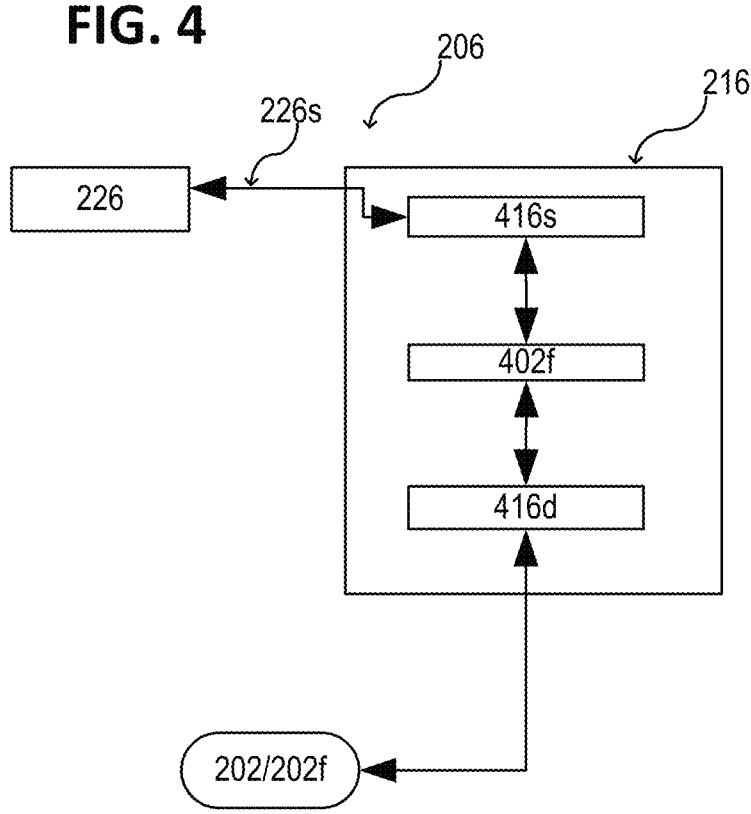
FIG. 4 shows an internal configuration of a mirror structure configured to mirror a filesystem according to some aspects of this disclosure.

FIG. 4 illustrates a schematic view of the mirror structure 216, e.g., of a processor 206 that mirrors a filesystem 202f of the storage device 202, according to some aspects. As described herein, a mirror of the storage device 202 or of the filesystem 202f of the storage device 202 may be provided by the mirror structure 216 to the filesystem scanner 226 to analyze 226s (e.g., to scan) the mirrored filesystem 402f and to generate hints for I/Os related to the filesystem 202f. As described above, the mirror structure 216 may be part of a storage system 200, e.g., of a host computing system or of a remote server system According to some aspects, the mirror structure 216 may include a block device driver 416d configured to mirror the storage device 202. The block device driver may be a virtual block device driver. According to some aspects, the mirror structure 216 may include a filesystem switch 416s for mounting the filesystem 202f of the storage device 202. The filesystem switch 416s may be a virtual filesystem switch.

According to some aspects, the mirror structure 216 may be further configured to detect a filesystem type 402f (e.g. XFS, EXT3, and the like) of the filesystem 202f of the storage device 202 and to mount the filesystem 202f of the storage device 202, e.g., in a read-only mode.

According to some aspects, the mirror structure 216 and the filesystem scanner 226 may be configured to access metadata of the filesystem 202f of the storage device 202. Additionally, one or more specified types of files may be accessed. In some aspects, the mirror structure 216 and the filesystem scanner 226 may be configured to access only metadata of the filesystem 202f of the storage device 202.

The processor 206, as described herein, may be configured to run an operation system (e.g. a host operation system or a remote server operation system) having an operation system kernel associated therewith. According to some aspects, the mirror structure 216 may be provided by the operation system kernel, or, in other words, the operation system kernel may be configured to provide a mirror of the storage device 202 or of the filesystem 202f of the storage device 202 to the filesystem scanner 226.

According to some aspects, the cache processor 208 may include a differentiated storage services logic to provide a handling policy for the received request 230 based on the classification 226c, where the classification 226c is not embedded into the received request 230 but provided by the filesystem scanner 226 scanning the filesystem 202f of the storage device 202, e.g. as a background thread.

According to some aspects, since the classification of the received I/Os 230 is provided by the filesystem scanner 226, this implementation does not require any modification of an existing storage software stack to benefit for example from a DSS logic. The filesystem scanner 226, as a background thread, may pin into cache filesystem metadata or files with specific size.

From a performance standpoint, the baseline is provided by caching with no classification—usually a LRU policy; see for example FIG. 1B. The classification provided by the filesystem scanner 226 allows distinguishing I/O meaning by corresponding I/O classes. A user (or a cache analytics with auto-tuning) may configure the cache engine as desired by setting the cache policy and the I/O classes as desired.

According to some aspects, the filesystem scanner 226 as described herein may be part of a host computing arrangement, as described in the following in more detail. In a similar way, the filesystem scanner 226 may be part of a remote storage arrangement.

The host computing arrangement may include a host processor (e.g., similar to the processor 206 described above) having a host operating system and host kernel associated therewith. According to some aspects, the host processor may be configured to host one or more a guest operating systems. The host processor may be further configured to mirror 216 a filesystem 202f of a guest operating system in the host kernel. The host processor may be further configured to generate caching criteria 226c by scanning 226s the mirrored filesystem 202f (see FIGS. 1 to 4). As described above, the host computing arrangement may further include a cache engine (also referred to as cache processor) 208 configured to process an I/O request 206 from the guest operating system based on the caching criteria 226c generated by the host processor 206.

The remote server arrangement may include a remote server processor 206 (e.g., similar to the processor 206 described above) having a remote server operating system and remote server kernel associated therewith. According to some aspects, the remote server processor 206 may be configured to communicate with a client operating system (e.g., via iSCSI or another storage area network (SAN) protocol). The remote server processor 206 may be further configured to mirror 216 a filesystem 202f of the client operating system in the remote server kernel. The remote server processor 206 may be further configured to generate caching criteria 226c by scanning 226s the mirrored filesystem 202f (see FIGS. 1 to 4). As described above, the remote server arrangement may further include a cache engine (also referred to as cache processor) 208 configured to process an I/O request 206 from the client operating system based on the caching criteria 226c generated by the remote server processor 206.

According to some aspects, the filesystem 202f may be stored on a primary storage 202 (also referred to as storage device 202). For caching I/Os requests 230 a cache storage device 204 may be implemented, as described herein.

According to some aspects, the host computing arrangement or the remote server arrangement may include the storage device 202 and the cache storage device 204. Alternatively, the host computing arrangement or the remote server arrangement may be coupled to storage device 202 and the cache storage device 204 (e.g., using a storage area network).

Figure 5:
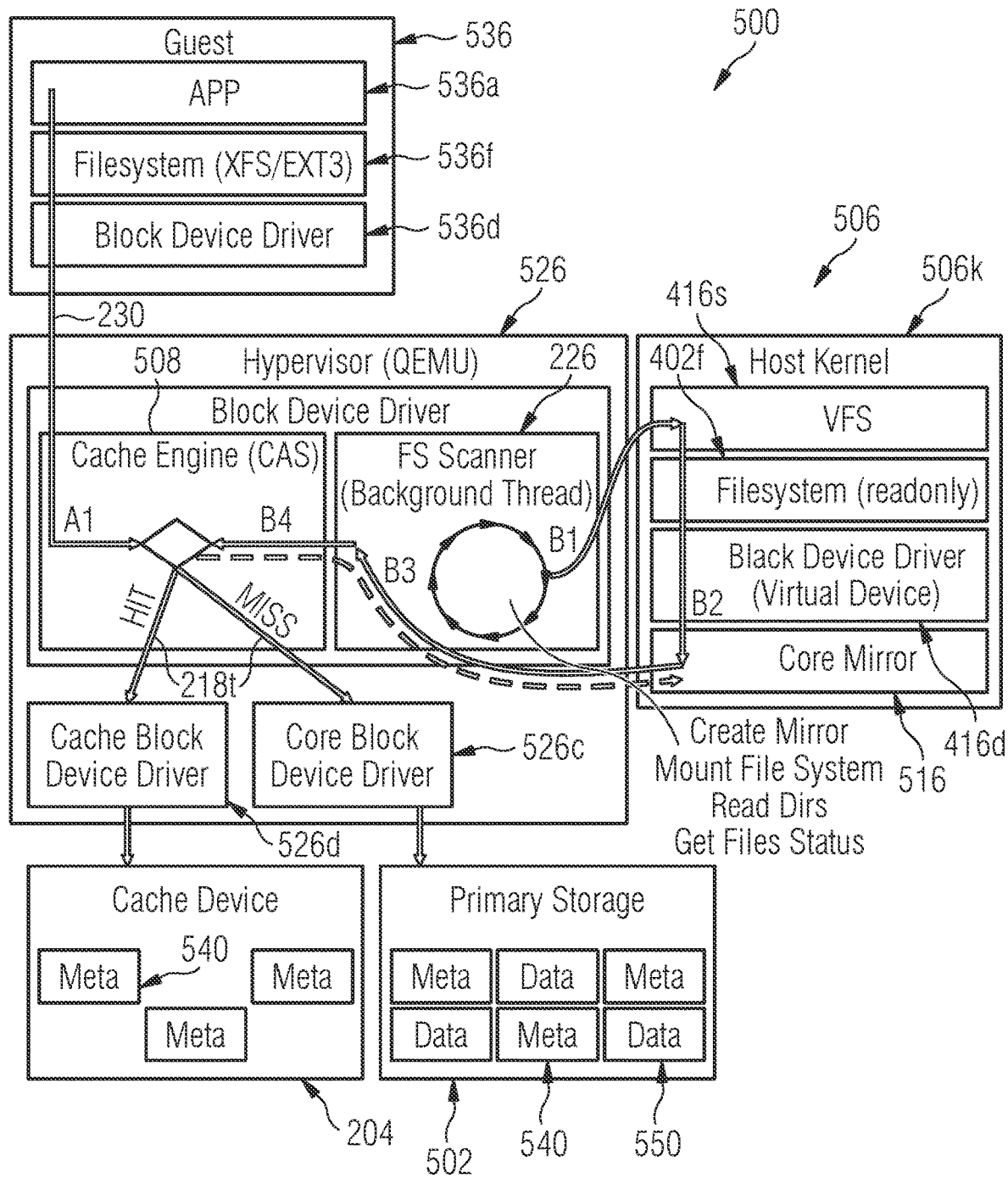
FIG. 5 shows a storage system architecture according to some aspects of this disclosure.

FIG. 5 illustrates a host computing system 500 in a schematic view, according to some aspects. The host computing system 500 may be configured in a similar way as described above with reference to the storage system 200, wherein the filesystem scanner 226 and the cache processor 208 are implemented in a hypervisor 526 environment. The host computing system 500 may include a host processor 506 (similar to the processor 206 described above with reference to the storage system 200) operating a host operating system (host OS) having a host kernel 506k associated therewith.

The hypervisor 526 (e.g., a QEMU or any other suitable hypervisor) is provided by the host computing system 500. The hypervisor 526 may be executed by the host processor 506. The hypervisor 526 may be configured to host a guest system 536, e.g., a guest operating system (guest OS) running (or in other words executing) at least one guest application 536a. The guest application 536a works on the guest filesystem 536f. The guest system 536 may be in general able to classify I/O, e.g., via at least one block device driver 536d. However, the guest system 536 may not have the possibility to inform the hypervisor 526 (e.g., QEMU) about the I/O class, e.g., the guest system 536 may not have the possibility to store the I/O class id in the I/O requests 230 (see reference sign A1). Thus, in case no other classification would be provided, the hypervisor 526 would handle all I/O requests 230 with the same priority. A cache engine 508 (e.g., similar or equal to the cache processor 208 as described above with reference to the storage system 200) may be implemented in the hypervisor 526. Without additionally providing a classification for the data 230 communicated with the guest system 536, all data 230 communicated with the guest system would be treated equally and the cache logic of the cache engine 508 cannot execute priority eviction and allocation mechanisms. As an example, without additionally providing a classification for the data 230 communicated with the guest system 536, all data 230 communicated with the guest system would be stored on the primary storage 502.

As described above, a mirror 516 of the primary storage 502 (also referred to as storage device 202) may be generated in the host OS kernel 506k. For a detection of filesystem structures, an existing kernel implementation of filesystems may be used. According to some aspects, a virtual block device may be provided in the kernel 506k that reflects to the primary storage 502. Illustratively, the host OS kernel 506k sees exactly the same data as a guest OS kernel. According to some aspects, data are provided to the host OS kernel 506k from the primary storage 502 via frontend cache API. According to some aspects, the filesystem scanner 226 as described herein may be implemented in the hypervisor 526.

Once the mirror 516 is created, the block device is available under the device tree on the host computing system 500. It allows detecting partition schema and filesystem type by the host OS kernel 506k.

After mounting the virtual block device, the filesystem scanner 226 may be able to read the filesystem tree and/or all other files with given sizes in background thread. I/Os from the core mirror 516 may be forwarded to the filesystem scanner 226 and the filesystem scanner 226 may be responsible for hinting I/Os 230, as described herein (see reference signs B1 to B3). Hinted I/Os may be passed to the cache engine 508 (see reference sign B4), where, for example, a DSS logic or any other desired cache policy may be executed. Finally, data may be returned back from primary storage 502, the cache engine 508, the filesystem scanner 226, the core mirror 516, the block device driver 416*d*, the mirrored filesystem 416*f*, and the virtual filesystem switch (VFS) 416*s*.

According to some aspects, the filesystem scanner 226 may be configured to carry out a periodic rescan to refresh the cache content and to detect, for example, new guest's filesystem changes.

According to some aspects, the executed operations described above allow, for example, to store most required and hot data (e.g., filesystem metadata) in the cache, e.g., in the cache device 204 (also referred to as cache storage device 204). I/Os 230 from the guest application 536*a* may be handled without changing already cached data classification and may be passed to the primary storage 502 in the case that no classification is available from the filesystem scanner 226.

According to some aspects, the virtual filesystem switch (VFS) 416*s* may include a set of standard interfaces to perform I/O requests for various filesystems. Therefore, various filesystems 402*f* can be detected and mounted via the host OS kernel 506*k*; and, after mounting, analyzed via the filesystem scanner 226. The respective filesystem 402*f* may be mounted in read-only mode to prevent interferences with the guest OS 536 accessing (e.g., changing) the filesystem 536*f* at the same time or in between two subsequent files system scans.

According to some aspects, a filesystem scanner 226 may be used, for example, in a similar way on iSCSI remote side of a remote storage arrangement, where the cache is provided. In other words, this way of providing hints for caching I/O requests that are transmitted without hints be used on both the compute node side (e.g., using QEMU) as well on the remote storage node (e.g., using iSCSI). In this case, the mirror of the filesystem is created via the processor and the operating system of the remote storage node.

According to some aspects, the cache engine 508 and the filesystem scanner 226 may be implemented in the hypervisor 526, e.g., in the QEMU. Further, a cache block device driver 526*d* and a core block device driver 526*c* may be implemented in the hypervisor 526 for communicating with the cache device 204 and the primary storage 502.

According to some aspects, only filesystem metadata 540 may be stored in the cache device 204, based on a classification (e.g., a tag or a hint that allows a classification) provided by filesystem scanner 226. The classification may associate the respective data, I/Os, files, etc., to specific classes and to therefore, the respective data, I/Os, files, etc., may be handled in accordance with their respective class. Since unclassified requests 230 may be stored in the primary storage 502, both data 550 and metadata 540 may be stored in the primary storage 504.

According to some aspects, the scanning of the filesystem on the host side may require additional memory for the host system (e.g., to store opened files and directories, filesystem entries like inodes, filesystem internal memory caches). If desired, the scanned (e.g., mirrored) filesystem 402*f* may be mounted with a memory footprint limit, according to some aspects. This can prevent excessive memory consumption. Further, additional IO from the filesystem scanner 226 may consume primary storage bandwidth and reduce the primary storage bandwidth for the guest, in particular during a first scan or in the case of cache misses. Thus, according to some aspects, the filesystem scanner 226 may be configured to throttle I/Os (e.g., for scanning) automatically in order to not disturb host workload.

Figure 6:
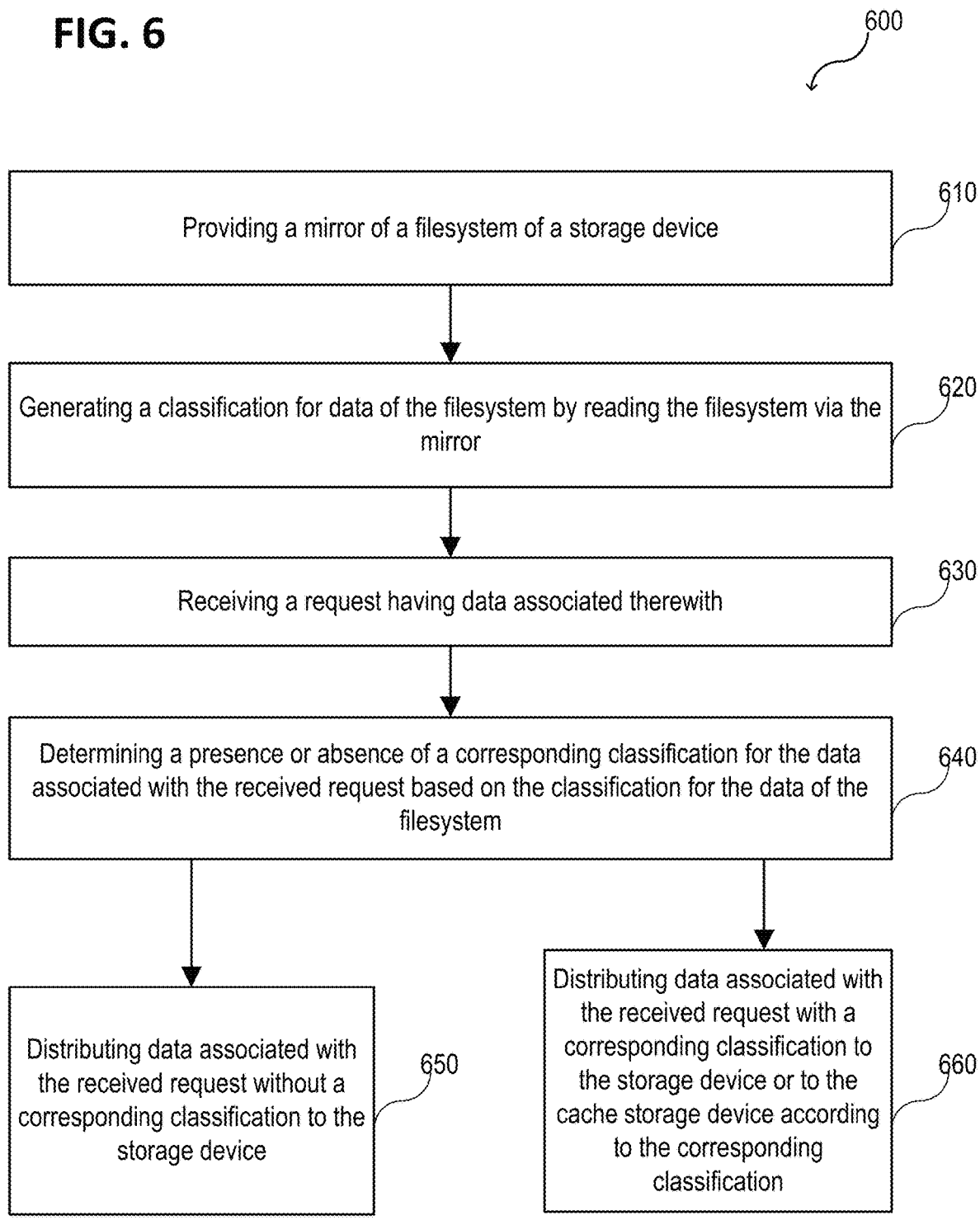
FIG. 6 shows a method of operating a computing system according to some aspects of this disclosure.

FIG. 6 illustrates a schematic flow diagram of a method 600 for operating a computing system (e.g., a storage system, e.g., a host system, e.g., a remote storage system), according to some aspects. The method 600 may include: in 610, providing a mirror of a filesystem of a storage device; in 620, generating a classification for data of the filesystem by reading the filesystem via the mirror, in 630, receiving a request having data associated therewith and, in 640, 650, 660, distributing the received request to the storage device or to a cache storage device. According to some aspects, distributing the received request may include: in 640, determining a presence or absence of a corresponding classification for the data associated with the received request based on the classification for the data of the filesystem, and, in 650, distributing data associated with the received request without a corresponding classification to the storage device, and, in 660, distributing data associated with the received request with a corresponding classification to the storage device or to the cache storage device according to the corresponding classification.

According to some aspects, distributing data may include to selectively read, write, and/or update of data, metafiles, files, etc. from the respective memory.

Figure 7:
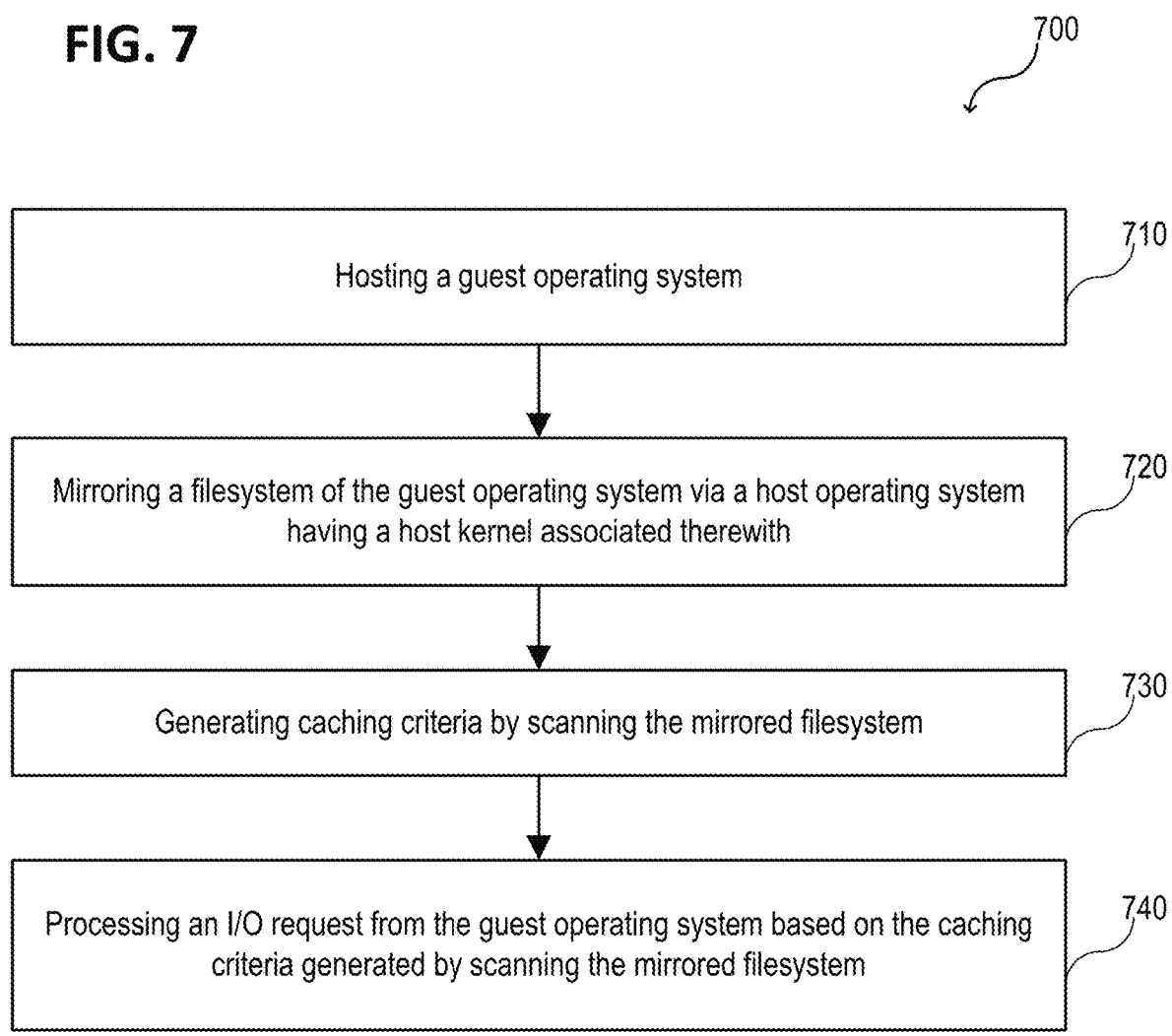
FIG. 7 shows an exemplary method of operating a host computing arrangement according to various aspects.

FIG. 7 illustrates a schematic flow diagram of a method 700 for operating a host computing arrangement or a host computing system, according to some aspects. According to some aspects, the method 700 may include: in 710, hosting a guest operating system, in 720, mirroring a filesystem of the guest operating system via a host operating system having a host kernel associated therewith, in 730, generating caching criteria by scanning the mirrored filesystem; and, in 740, processing an I/O request from the guest operating system based on the caching criteria generated by scanning the mirrored filesystem.

Figure 8:
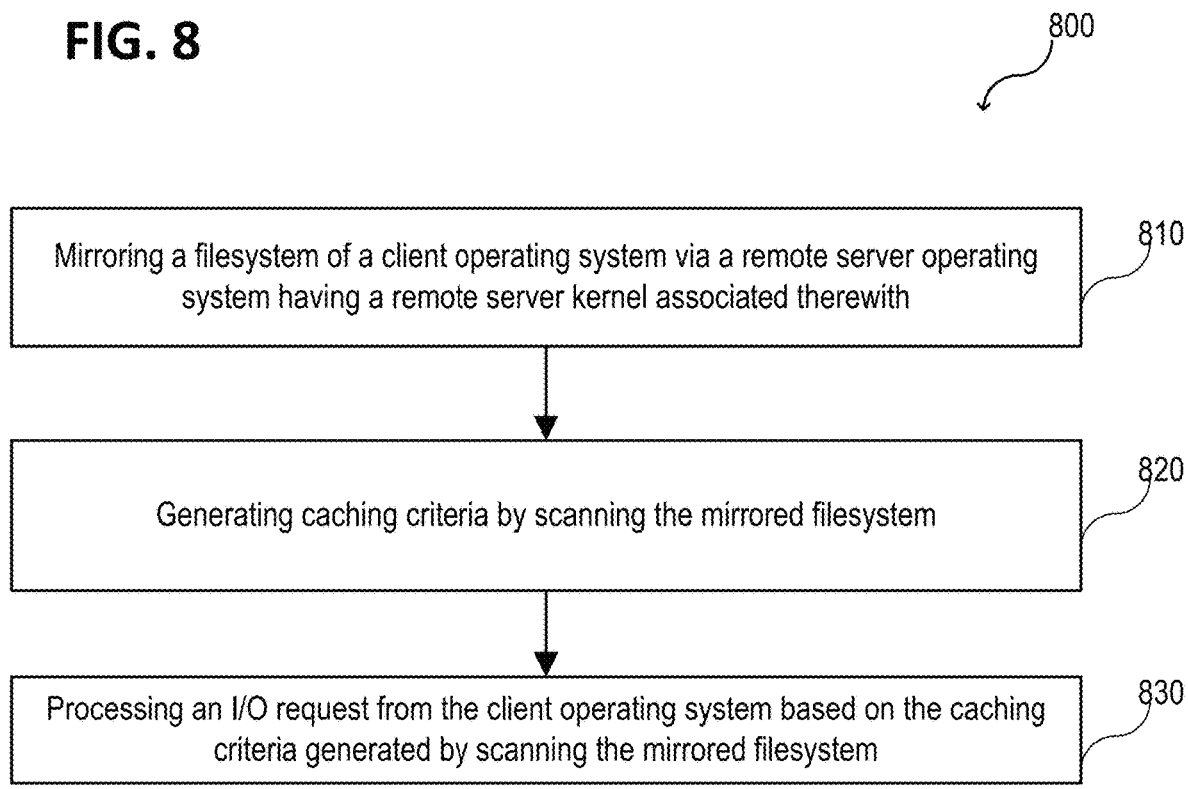
FIG. 8 shows a method of operating a remote server arrangement according to various aspects of this disclosure.

FIG. 8 illustrates a schematic flow diagram of a method 800 for operating a remote server arrangement or a remote server system, according to some aspects. According to some aspects, the method 800 may include: in 810, mirroring a filesystem of a client operating system via a remote server operating system having a remote server kernel associated therewith; in 820, generating caching criteria by scanning the mirrored filesystem; and, in 830, processing an I/O request from the client operating system based on the caching criteria generated by scanning the mirrored filesystem.

According to some aspects, in remote server arrangement or in a remote server system, at least one remote server processor may be configured to communicate with a client, e.g. with a client operating system.

According to some aspects, a storage system may include for example: a storage device; a cache storage device; a processor configured to provide a filesystem scanner with a mirror storage device, wherein the mirror storage device is at least partially mirroring data from the storage device, and mount the mirror storage device. The filesystem scanner may be configured to read the mounted mirror storage device; and generate a classification tag corresponding to mirrored data from the mounted mirror storage device. A cache processor may be used configured to receive data to be stored, determine a presence of a corresponding generated classification tag for the received data and distribute the received data to the storage device or to a cache storage device such that: received data without a corresponding classification tag are stored in the storage device; and received data with a corresponding classification tag are stored in the storage device or in the cache storage device according to the corresponding classification tag.

According to some aspects, a method for operating a storage system may include: generating a mirror storage device that at least partially mirrors a storage device; mounting the mirror storage device; reading the mounted mirror storage device and generating a classification tag corresponding to mirrored data from the mounted mirror storage device; receiving data for storage and distributing the received data to the storage device or to a cache storage device, wherein distributing the received data includes: determining a presence of a corresponding generated classification tag (from the plurality of classification tags) for the received data, and storing the received data without a corresponding generated classification tag (i.e. not generated by the filesystem scanner) in the storage device, and storing the received data with a corresponding generated classification tag in the storage device or in the cache storage device according to the corresponding generated classification tag.

According to some aspects, a host computing system may include: a host processor configured to host a virtual machine; the host processor further configured to provide a mirror storage device, the mirror storage device at least partially mirroring data from a storage device, the host processor further configured to detect a filesystem of the mirror storage device and to mount the filesystem (e.g., in read-only mode); a filesystem scanner configured to generate at least one classification tag corresponding to at least one file from the mounted filesystem; a cache engine configured to receive a file to be stored from the virtual machine and to evaluate whether a corresponding classification tag is provided for the received file from the filesystem scanner and to distribute the received file to the storage device or to a cache storage device, wherein the received file without a corresponding classification tag (i.e. a file that is not classified by the filesystem scanner) is stored in the storage device and wherein the received file with a corresponding classification tag (i.e. a file that is classified by the filesystem scanner) is stored in the storage device or in the cache storage device according to the corresponding classification tag.

According to some aspects, a remote storage system may include: a processor configured to provide a mirror storage device, the mirror storage device at least partially mirroring data from a storage device, the processor further configured to detect a filesystem of the mirror storage device and to mount the filesystem (e.g., in read-only mode); a filesystem scanner configured to generate at least one classification tag corresponding to at least one file from the mounted filesystem; a cache engine configured to receive a file to be stored from a client computer system and to evaluate whether a corresponding classification tag is provided for the received file from the filesystem scanner and to distribute the received file to the storage device or to a cache storage device, wherein the received file without a corresponding classification tag (i.e. a file that is not classified/tagged by the filesystem scanner) is stored in the storage device and wherein the received file with a corresponding classification tag (i.e. a file that is classified/tagged by the filesystem scanner) is stored in the storage device or in the cache storage device according to the corresponding classification tag.

According to some aspects, a method for operating a computing system (e.g., a host computing system for hosting a virtual machine or a remote storage system) may include: operating a cache engine and a filesystem scanner, creating a mirror storage device at least partially mirroring a storage device that communicates with the cache engine, detecting a filesystem of the mirror storage device, mounting the mirror storage device, generating classification tags corresponding to files from the mirror storage device respectively. In this case, operating the cache engine may include receiving a file to be stored (e.g., from a virtual machine or from a remote client) and evaluating whether a corresponding classification tag is provided for the received data from the filesystem scanner and distributing the received file to the storage device or to a cache storage device, wherein the received file without a corresponding classification tag (i.e. not generated by the filesystem scanner) provided by the filesystem scanner is stored in the storage device and wherein the received file with a corresponding classification tag (i.e. generated by the filesystem scanner) provided by the filesystem scanner is stored in the storage device or in the cache storage device according to the corresponding classification tag.

According to some aspects, a storage system may include a storage device; a cache storage device, a processor, and a cache engine. The processor may be configured to provide a mirror storage device to a filesystem scanner, the mirror storage device being at least partially mirroring data from the storage device, and mount the mirror storage device. The filesystem scanner may be configured to read the mounted mirror storage device; and generate a classification tag corresponding to mirrored data from the mounted mirror storage device. The cache processor may include configured to receive data to be stored, determine a presence of a corresponding generated classification tag for the received data and distribute the received data to the storage device or to the cache storage device such that: received data without a corresponding classification tag are stored in the storage device; and received data with a corresponding classification tag are stored in the storage device or in the cache storage device according to the corresponding classification tag. In this case, the processor may be further configured to mount the mirror storage device in read-only mode, to detect the filesystem of the mirror storage device, to run an operation system with a kernel including a virtual filesystem switch to mount the detected filesystem using the kernel, and/or to provide the mirror storage device as a virtual mirror storage device. The processor may be further configured to provide a virtual machine monitor for hosting a virtual machine sending the data to be stored, and, alternatively, to provide a remote storage server for communicating with a client sending the data to be stored.

According to some aspects, a storage system may include: a storage device; a cache storage device; a processor configured to provide a filesystem scanner with a mirror storage device, wherein the mirror storage device is at least partially mirroring files from the storage device, and mount the mirror storage device; wherein the filesystem scanner is configured to generate a file classification for the mirrored files from the mounted mirror storage device; a cache processor configured to receive a file to be stored, determine a presence of a corresponding generated file classification for the received file and distribute the received file to the storage device or to the cache storage device such that: a received file without a corresponding generated file classification is stored in the storage device; and a received file with a corresponding generated file classification is stored in the storage device or in the cache storage device according to the corresponding file classification.

According to some aspects, a method for operating a storage system may include: generating a mirror storage device that at least partially mirrors a storage device; mounting the mirror storage device; reading the mounted mirror storage device and generating a classification tag corresponding to mirrored data from the mounted mirror storage device; receiving data for storage and distributing the received data to the storage device or to a cache storage device. Distributing the received data may include: determining a presence of a corresponding generated classification tag (from the plurality of classification tags) for the received data, and storing the received data without a corresponding generated classification tag (i.e. not generated by the filesystem scanner) in the storage device, and storing the received data with a corresponding generated classification tag in the storage device or in the cache storage device according to the corresponding generated classification tag.

According to some aspects, the cache processor 208 (or the cache engine) described herein may be further configured to distribute the received data to the storage device 202 or to the cache storage device 204 using differentiated storage services logic (DSS). The differentiated storage services logic may include assigning data request to various class indicated by a classification tag (also referred to as a hint) and to apply a handling policy for the data according to the respective class.

According to various aspects, the cache processor may handle I/Os from the client or from the guest operating system as unclassified data with a pre-defined (e.g., the lowest) priority. In this case, the unclassified data may be cached as long as space is available in the cache storage device or as long as the cache storage device is not completely occupied by data having a higher priority. The filesystem scanner may send hinted I/Os to the cache engine that are handled accordingly. In the case that there is no space at the cache storage device, unclassified data are passed through to the storage device. The cache engine may evict data based on hinted I/Os from the filesystem scanner.

In some aspects, based on the hints generated by the filesystem scanner (e.g., using a look-up table, etc.) unclassified data may be reclassified and the cache engine may handle the reclassified data accordingly.

According to various aspects, the filesystem scanner I/O requests may be hinted I/O requests. I/Os from the guest (or a client) may not be hinted. Upon an I/O request from the guest, the cache engine may determine whether to access the cache storage device or the storage device to fulfill the I/O request, which is also referred to as hit or miss. In the case of a hit, the I/O request may be read from the cache storage device. In the case of a miss, the I/O request may be read from the storage device. According to some aspects, the filesystem scanner may be configured to read data from the primary storage and support hints to the cache engine so that the cache engine may classify the data.

According to various aspects, an I/O request without hints may be classified with a predefined class (e.g., also "unclassified" may be a class with a low priority) and the cache engine may perform a hit lookup to check, whether the I/O request can be fetched from the cache storage device or not. In the case of a miss, these unclassified I/O request may be fetched from the storage device, if there is no unused space available in the cache or if the cache is full with data of higher priority. Therefore, unclassified data may be cached as well by reading from primary and caching these data with lowest priority. The filesystem scanner may be used to insert data with higher priority into the cache and/or to remove data with lower priority from the cache and write these data with lower priority to primary storage (also referred to as eviction).

According to various aspects, the filesystem scanner may generate I/OS with hints based on the scanning of the filesystem. According to various aspects, the type of files to be scanned by the filesystem scanner may be configurable, e.g., specific file types may be scanned, files with a pre-defined file size may be scanned, metadata may be scanned, etc. According to various aspects, the filesystem scanner may scan only filesystem metadata or the filesystem scanner may scan both filesystem data and filesystem metadata. According to various aspects, the filesystem scanner may scan the filesystem tree (e.g., reading names of the files and go deeper in the file structure) and, e.g., optionally, scan attributes of the files. Attributes of the files may be date of last modification, file size, file type (e.g., extension of the file), etc. As an example, a user may instruct the filesystem scanner to read files with a pre-defined file size and less.

According to various aspects, corresponding caching criteria may include a cache map, a lookup, a cache configuration, tags (classification) configuration, etc. According to various aspects, the cache engine may include a first caching policy for unclassified data and a second caching policy considering the caching criteria provided by the filesystem scanner.

According to various aspects, after scanning the filesystem, I/Os that may carry embedded I/O class (e.g. a classification tag) may be used by the cache engine. Alternatively or additionally, a classification structure (e.g., a look-up table) may be used by the cache engine when serving I/Os from a guest or client having no I/O hints; the cache engine may, in this case, re-classify I/Os from unclassified to some I/O class on the basis of information of the classification structure.

According to various aspects, the cache engine may additionally classify I/Os by its own in the case that no I/O classification is provided. The cache engine may check whether requested data are in the cache or not, and if the requested data are available in the cache, return the requested data the requester. If the requested data are not available in the cache, the cache engine may fetch the requested data from primary storage, and may try to find a place in cache for the requested data. In this case, the cache engine may perform an eviction operation (e.g., removing data with less priority). However, in this case only an I/O class with lower or equal priority may be evicted. If no storage space may be found in the cache, the requested I/O may be forwarded to the primary storage only. According to various aspects, based on the classification provided by the filesystem scanner, data with higher priority may be written to the cache that may be not evicted by the cache engine on its own.

According to various aspects, if no classification may be available for in the I/O, the cache engine may try to fetch data from cache storage if they are available. Further, unclassified data may be handled with a low priority (e.g., the lowest priority) and the cache engine may apply a Pass-Through policy (e.g., fetch data from primary storage only). Another possibility may be to allocate space for this I/O in cache. However, allocation may not remove more important I/O classes (e.g., IO classes from filesystem scanner).

In the following, various examples are provided with reference to the aspects described above.

Example 1 is a host computing arrangement. The host computing arrangement may include a host processor having a host operating system and host kernel associated therewith, the host processor being configured to host a guest operating system, mirror a filesystem of the guest operating system via the host kernel, and generate caching criteria by scanning the mirrored filesystem. The host computing arrangement may further include a cache engine configured to process an I/O request based on the caching criteria generated by the host processor.

In Example 2, the subject matter of Example 1 can optionally include that the host processor is further configured to provide a virtual machine monitor hosting the guest operating system.

In Example 3, the subject matter of Example 2 can optionally include that the virtual machine monitor includes a filesystem scanner configured to scan the mirrored filesystem.

In Example 4, the subject matter of any one of Examples 2 or 3 can optionally include that the virtual machine monitor is configured to provide the cache engine.

In Example 5, the subject matter of any one of Examples 1 to 4 can optionally include that the host processor is configured to mirror the filesystem via a block device driver.

In Example 6, the subject matter of any one of Examples 1 to 5 can optionally include that the host processor is configured to mirror the filesystem via a filesystem switch mounting the filesystem.

In Example 7, the subject matter of any one of Examples 1 to 6 can optionally include that the host processor is configured to mirror the filesystem by detecting a filesystem type of the filesystem and mounting the filesystem.

In Example 8, the subject matter of Example 7 can optionally include that the host processor is configured to mount the filesystem in a read-only mode.

In Example 9, the subject matter of any one of Examples 1 to 8 can optionally include that the host computing arrangement further includes a storage device and a cache storage device. The cache engine is configured to determine a presence of a corresponding caching criteria for an I/O request from the guest operating system and to distribute the I/O request from the guest operating system to the storage device or to the cache storage device.

In Example 10, the subject matter of Example 9 can optionally include that the cache engine is configured to distribute the I/O request from the guest operating system such that an I/O request without a corresponding caching criteria is distributed to the storage device.

In Example 11, the subject matter of any one of Examples 9 or 10 can optionally include that the cache engine is configured to distribute the I/O request from the guest operating system such that an I/O request with a corresponding caching criteria is distributed to the storage device or to the cache storage device according to the corresponding caching criteria.

In Example 12, the subject matter of any one of Examples 1 to 8 can optionally include that the host computing arrangement further includes a storage device and a cache storage device. The host processor is configured to provide an I/O request with a corresponding caching criteria generated by the host processor to the cache engine.

In Example 13, the subject matter of Example 12 can optionally include that the cache engine is configured at least one of allocate data into the cache storage device or to evict data from the cache storage device based on the caching criteria associated with the I/O request from the host processor.

Example 14 is a method for operating a host computing arrangement. The method may include hosting a guest operating system, mirroring a filesystem of the guest operating system via a host operating system having a host kernel associated therewith, generating caching criteria by scanning the mirrored filesystem, and processing an I/O request based on the caching criteria generated by scanning the mirrored filesystem.

In Example 15, the subject matter of Example 14 can optionally include that the method further includes providing a virtual machine monitor hosting the guest operating system.

In Example 16, the subject matter of Example 15 can optionally include that the method further includes scanning the mirrored filesystem via a filesystem scanner of the virtual machine monitor.

In Example 17, the subject matter of any one of Examples 15 or 16 can optionally include that the method further includes providing a cache engine via the virtual machine monitor.

In Example 18, the subject matter of any one of Examples 15 to 17 can optionally include that the method further includes mirroring the filesystem via a block device driver.

In Example 19, the subject matter of any one of Examples 15 to 18 can optionally include that the method further includes mirroring the filesystem via a filesystem switch mounting the filesystem.

In Example 20, the subject matter of any one of Examples 15 to 19 can optionally include that the method further includes detecting a filesystem type of the filesystem and mounting the filesystem to mirror the filesystem.

In Example 21, the subject matter of Example 20 can optionally include that the filesystem is mounted in a read-only mode.

In Example 22, the subject matter of any one of Examples 15 to 21 can optionally include that the method further includes determining a presence of a corresponding caching criteria for an I/O request from the guest operating system, and distributing the I/O request from the guest operating system to a storage device or to a cache storage device.

In Example 23, the subject matter of Example 22 can optionally include that an I/O request without a corresponding caching criteria is distributed to the storage device.

In Example 24, the subject matter of any one of Examples 22 or 23 can optionally include that an I/O request with a corresponding caching criteria is distributed to the storage device or to the cache storage device according to the corresponding caching criteria.

In Example 25, the subject matter of any one of Examples 15 to 21 can optionally include that the method further includes generating an I/O request with a corresponding caching criteria via the host operating system and caching data based on the corresponding caching criteria.

Example 26 is a remote server arrangement. The remote server arrangement may include a remote server processor having a remote server operating system and remote server kernel associated therewith, the remote server processor being configured to mirror a filesystem of a client operating system in the remote server kernel, and generate caching criteria by scanning the mirrored filesystem. The remote server arrangement may further include a cache engine configured to process an I/O request based on the caching criteria generated by the remote server processor.

In Example 27, the subject matter of Example 26 can optionally include that the remote server processor is further configured to provide a Transmission Control Protocol (TCP) based communication with the client operating system.

In Example 28, the subject matter of any one of Examples 26 or 27 can optionally include that the remote server processor is further configured to provide an internet Small Computer System Interface (iSCSI) or nonvolatile memory express (NVMe) over fabrics based communication with the client operating system.

In Example 29, the subject matter of any one of Examples 26 to 28 can optionally include that the remote server processor is configured to provide a filesystem scanner configured to scan the mirrored filesystem.

In Example 30, the subject matter of any one of Examples 26 to 29 can optionally include that the remote server processor is configured to provide the cache engine.

In Example 31, the subject matter of any one of Examples 26 to 30 can optionally include that the remote server processor is configured to mirror the filesystem via a block device driver.

In Example 32, the subject matter of any one of Examples 26 to 31 can optionally include that the remote server processor is configured to mirror the filesystem via a filesystem switch for mounting the filesystem.

In Example 33, the subject matter of any one of Examples 26 to 32 can optionally include that the remote server processor is configured to mirror the filesystem by detecting a filesystem type of the filesystem and mounting the filesystem.

In Example 34, the subject matter of Example 33 can optionally include that the remote server processor is configured to mount the filesystem in a read-only mode.

In Example 35, the subject matter of any one of Examples 26 to 34 can optionally include that the remote server arrangement further includes a storage device, and a cache storage device. The cache engine is configured to determine a presence of a corresponding caching criteria for an I/O request from the client operating system and to distribute the I/O request from the client operating system to the storage device or to the cache storage device.

In Example 36, the subject matter of Example 35 can optionally include that the cache engine is configured to distribute the I/O request from the client operating system such that an I/O request without a corresponding caching criteria is distributed to the storage device.

In Example 37, the subject matter of any one of Examples 35 or 36 can optionally include that the cache engine is configured to distribute the I/O request from the client operating system such that an I/O request with a corresponding caching criteria is distributed to the storage device or to the cache storage device according to the corresponding caching criteria.

In Example 38, the subject matter of any one of Examples 26 to 34 can optionally include that the remote server arrangement further includes a storage device, and a cache storage device. The remote server processor is configured to provide an I/O request with a corresponding caching criteria generated by the host processor to the cache engine.

In Example 39, the subject matter of Example 38 can optionally include that the cache engine is configured at least one of allocate data into the cache storage device or to evict data from the cache storage device based on the caching criteria associated with the I/O request from the remote server processor.

Example 40 is a method for operating a remote server arrangement. The method may include mirroring a filesystem of a client operating system via a remote server operating system having a remote server kernel associated therewith, generating caching criteria by scanning the mirrored filesystem, and processing an I/O request based on the caching criteria generated by scanning the mirrored filesystem.

In Example 41, the subject matter of Example 40 can optionally include that the method further includes scanning the mirrored filesystem via a filesystem scanner of the virtual machine monitor.

In Example 42, the subject matter of any one of Examples 40 or 41 can optionally include that the method further includes mirroring the filesystem via a block device driver.

In Example 43, the subject matter of any one of Examples 40 to 42 can optionally include that the method further includes mirroring the filesystem via a filesystem switch mounting the filesystem.

In Example 44, the subject matter of any one of Examples 40 to 43 can optionally include that the method further includes detecting a filesystem type of the filesystem and mounting the filesystem to mirror the filesystem.

In Example 45, the subject matter of Example 44 can optionally include that the filesystem is mounted in a read-only mode.

In Example 46, the subject matter of any one of Examples 40 to 45 can optionally include that the method further includes determining a presence of a corresponding caching criteria for the I/O request from the client operating system, and distributing the I/O request from the client operating system to a storage device or to a cache storage device.

In Example 47, the subject matter of Example 46 can optionally include that an I/O request without a corresponding caching criteria is distributed to the storage device.

In Example 48, the subject matter of any one of Examples 46 or 47 can optionally include that an I/O request with a corresponding caching criteria is distributed to the storage device or to the cache storage device according to the corresponding caching criteria.

Example 49 is a storage system. The storage system may include a storage device, a cache storage device, and a processor configured to provide a filesystem of the storage device to a filesystem scanner via a mirror structure mirroring the storage device, the filesystem scanner being configured to generate a classification for data of the filesystem, the data of the filesystem being provided to the filesystem scanner via the mirror structure mirroring the storage device. The storage system may further include a cache processor configured to receive a request having data associated therewith, to determine a presence or absence of a corresponding classification for the data associated with the received request based on the classification for the data of the filesystem generated by the filesystem scanner, and to distribute the data associated with the received request to the storage device or to the cache storage device such that data associated with the received request without a corresponding classification are distributed to the storage device, and such that data associated with the received request with a corresponding classification are distributed to the storage device or to the cache storage device according to the corresponding classification.

In Example 50, the subject matter of Example 49 can optionally include that the mirror structure includes a block device driver configured to mirror the storage device.

In Example 51, the subject matter of Example 50 can optionally include that the block device driver is a virtual block device driver.

In Example 52, the subject matter of any one of Examples 49 to 51 can optionally include that the mirror structure includes a filesystem switch mounting the filesystem of the storage device.

In Example 53, the subject matter of Example 52 can optionally include that the filesystem switch is configured as a virtual filesystem switch.

In Example 54, the subject matter of any one of Examples 49 to 53 can optionally include that the mirror structure is further configured to detect a filesystem type of the filesystem of the storage device.

In Example 55, the subject matter of any one of Examples 49 to 54 can optionally include that the mirror structure is further configured to mount the filesystem of the storage device.

In Example 56, the subject matter of Example 55 can optionally include that the mirror structure is configured to mount the filesystem of the storage device in a read-only mode.

In Example 57, the subject matter of any one of Examples 55 or 56 can optionally include that the mirror structure is configured to mount the filesystem with a memory footprint limit.

In Example 58, the subject matter of any one of Examples 49 to 57 can optionally include that the processor is further configured to run an operation system based on an operation system kernel, and that the mirror structure is provided via the operation system kernel.

In Example 59, the subject matter of any one of Examples 49 to 58 can optionally include that the processor is a host processor configured to operate a host operating system. The host operating system is configured to provide a virtual machine monitor hosting a virtual machine. The virtual machine is configured to send the request to the cache processor.

In Example 60, the subject matter of Example 59 can optionally include that the virtual machine monitor includes the filesystem scanner.

In Example 61, the subject matter of any one of Examples 59 or 60 can optionally include that the cache processor is implemented in the virtual machine monitor.

In Example 62, the subject matter of any one of Examples 59 to 61 can optionally include that the mirror structure is implemented in a host kernel of the host operating system.

In Example 63, the subject matter of any one of Examples 59 to 62 can optionally include that the virtual machine includes a guest operation system based on a guest kernel communicating with the storage device.

In Example 64, the subject matter of any one of Examples 59 to 63 can optionally include that the filesystem scanner is implemented in the virtual machine monitor.

In Example 65, the subject matter of Example 64 can optionally include that the filesystem scanner is configured as a background thread.

In Example 66, the subject matter of any one of Examples 49 to 65 can optionally include that the processor is a remote storage processor communicating with a storage system external client system, and that the client system is configured to send the request to the cache processor.

In Example 67, the subject matter of any one of Examples 49 to 66 can optionally include that the request having data associated therewith is received without classification data corresponding to the distribution of the data associated with the received request to the storage device or to the cache storage device.

In Example 68, the subject matter of any one of Examples 49 to 67 can optionally include that the cache processor includes differentiated storage services (DSS) logic configured to provide a handling policy for the received request based on the classification for the data of the filesystem.

In Example 69, the subject matter of any one of Examples 49 to 68 can optionally include that the classification for the data of the filesystem includes generating one or more classification tags corresponding to the data of the filesystem. Each classification tag defines a specific class of a plurality of classes assigned to a particular handling policy.

In Example 70, the subject matter of any one of Examples 49 to 69 can optionally include that a frontend application programming interface is configured to provide the data of the filesystem to the mirror structure.

In Example 71, the subject matter of any one of Examples 49 to 70 can optionally include that the filesystem scanner is configured to generate the classification for data of the filesystem by reading the data of the filesystem.

In Example 72, the subject matter of any one of Examples 49 to 71 can optionally include that the filesystem scanner is configured to update the classification for data of the filesystem in a pre-defined time interval.

Example 73 is a method for operating a storage system. The method may include providing a mirror of a filesystem of a storage device, generating a classification for data of the filesystem by reading the filesystem via the mirror, and receiving a request having data associated therewith and distributing the received request to the storage device or to a cache storage device. Distributing the received request includes determining a presence or absence of a corresponding classification for the data associated with the received request based on the classification for the data of the filesystem, distributing data associated with the received request without a corresponding classification to the storage device, and distributing data associated with the received request with a corresponding classification to the storage device or to the cache storage device according to the corresponding classification.

In Example 74, the subject matter of Example 73 can optionally include that providing the mirror of the filesystem of the storage device includes providing a block device driver configured to mirror the storage device.

In Example 75, the subject matter of any one of Examples 73 or 74 can optionally include that providing the mirror of the filesystem of the storage device includes providing a filesystem switch for mounting the filesystem of the storage device.

In Example 76, the subject matter of any one of Examples 73 to 75 can optionally include that providing the mirror of the filesystem of the storage device further includes detecting a filesystem type of the filesystem of the storage device.

In Example 77, the subject matter of any one of Examples 73 to 76 can optionally include that providing the mirror of the filesystem of the storage device further includes mounting the filesystem of the storage device.

In Example 78, the subject matter of Example 77 can optionally include that mounting the filesystem of the storage device includes mounting the filesystem with a memory footprint limit.

In Example 79, the subject matter of any one of Examples 73 to 78 can optionally include that the method further includes operating an operation system based on an operation system kernel, and providing the mirror of the filesystem of the storage device via the operation system kernel.

In Example 80, the subject matter of any one of Examples 73 to 79 can optionally include that the method further includes operating a host operating system, providing a virtual machine monitor and hosting a virtual machine via the virtual machine monitor, and sending the request to a cache processor via the virtual machine.

In Example 81, the subject matter of Example 80 can optionally include that hosting a virtual machine includes hosting a guest operation system based on a guest kernel, the guest kernel communicating with the storage device.

In Example 82, the subject matter of Example 81 can optionally include that generating the classification for data of the filesystem is a background thread.

In Example 83, the subject matter of any one of Examples 73 to 82 can optionally include that the method further includes operating a remote storage server operating system that communicates with a client system, and sending the request to a cache processor via the client system.

In Example 84, the subject matter of any one of Examples 73 to 83 can optionally include that receiving the request having data associated therewith includes receiving the request without classification data corresponding to the distribution of the data associated with the received request to the storage device or to the cache storage device.

In Example 85, the subject matter of any one of Examples 73 to 84 can optionally include that the method further includes handling the received request based on the classification for the data of the filesystem and a handling policy according to the classification.

In Example 86, the subject matter of any one of Examples 73 to 85 can optionally include that generating the classification for data of the filesystem includes generating one or more classification tags corresponding to the data of the filesystem, and defining a specific class of a plurality of classes assigned to a particular handling policy for each of the one or more classification tags.

In Example 87, the subject matter of any one of Examples 73 to 86 can optionally include that the method further includes mirroring the data of the filesystem via a frontend application programming interface.

In Example 88, the subject matter of any one of Examples 73 to 87 can optionally include that the method further includes updating the classification for data of the filesystem in a pre-defined time interval.

Example 89 is a non-transitory computer readable medium storing instructions that when executed by a processor cause the processor to perform the method according to any one of Examples 14 to 25, 40 to 58, and 73 to 88.

Example 90 is a computing system. The computing system may include a processor operating a first operating system and a kernel associated therewith, the processor being configured to communicate with a second operating system, the second operating system including a filesystem associated therewith, a cache engine configured to receive an I/O request from the second operating system, a look-up table including caching information corresponding to the I/O request received from the second operating system, the caching information defining a caching rule for the I/O request. The cache engine is configured to handle the I/O request received from the second operating system according to the caching rule defined by the caching information of the look-up table. The processor is configured to generate the look-up table by mounting a mirror of the filesystem of the second operating system in the kernel and scanning the mounted mirror of the filesystem.

In Example 91, the subject matter of Example 90 can optionally include that the cache engine is configured to distribute the I/O request from the second operating system such that an I/O request without a corresponding caching information is distributed to a storage device.

In Example 92, the subject matter of any one of Examples 90 or 91 can optionally include that the cache engine is configured to distribute the I/O request from the second operating system such that an I/O request with a corresponding caching information is distributed to a storage device or to a cache storage device according to the corresponding caching information.

Example 93 is a computing system. The computing system may include a processor operating a first operating system and a kernel associated therewith, the processor being configured to communicate with a second operating system, the second operating system including a filesystem associated therewith, a filesystem scanner being configured to generate a classified I/O request by mounting a mirror of the filesystem of the second operating system in the kernel and scanning the mounted mirror of the filesystem, a cache engine configured to receive the classified I/O request from the file system scanner and to perform at least one of an allocation or an eviction operation based on the classified I/O request received from the file system scanner.

In Example 94, the subject matter of Example 93 can optionally include that the cache engine is further configured to distribute an I/O request from the second operating system such that an I/O request with a corresponding caching information is distributed to a storage device or to a cache storage device according to the corresponding caching information.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. A host computing arrangement, comprising:
a host processor having a host operating system and host kernel associated therewith,
the host processor being configured to:
provide a virtual machine monitor configured to host a guest operating system, and
mirror a filesystem of the guest operating system via the host kernel,
wherein the virtual machine monitor comprises a filesystem scanner configured to:
perform a scan of the mirrored filesystem,
generate classification information including a plurality of classification tags corresponding to data of the mirrored filesystem, based on the scan of the mirrored filesystem,
provide the plurality of classification tags; and
a cache engine configured to:
receive an I/O request from the guest operating system, and
process the received I/O request based on a presence or an absence of at least one classification tag, corresponding to the received I/O request, from among the plurality of classification tags provided by the filesystem scanner,
wherein the received I/O request is received without any of the plurality of classification tags provided by the filesystem scanner including the at least one classification tag.

2. The host computing arrangement of claim 1, further comprising:
a storage device; and
a cache storage device,
wherein the cache engine is further configured to:
determine the presence or the absence of the at least one classification tag, corresponding to the received I/O request, from among the plurality of classification tags provided by the filesystem scanner, and distribute the received I/O request to the storage device or to the cache storage device.

3. The host computing arrangement of claim 2,
wherein the presence of the at least one classification tag corresponding to the received I/O request is determined, and
wherein the cache engine is configured to distribute the received I/O request to the storage device or to the cache storage device in accordance with the at least one classification tag.

4. The host computing arrangement of claim 1, further comprising:
a storage device; and
a cache storage device,
wherein the host processor is configured to provide the received I/O request and the at least one classification tag to the cache engine when the at least one classification tag is present.

5. The host computing arrangement of claim 1,
wherein the host operating system is different from the guest operating system.

6. A storage system, comprising:
a storage device;
a cache storage device;
a processor configured to provide a filesystem of the storage device to a filesystem scanner via a mirror structure,
wherein the mirror structure is configured to:
mirror the filesystem of the storage device, and
provide data of the mirrored filesystem to the filesystem scanner,
wherein the filesystem scanner is configured to:
perform a scan of the mirrored filesystem,
generate classification information including a plurality of classification tags corresponding to the data of the mirrored filesystem, and
provide the plurality of classification tags; and
a cache processor configured to:
receive a request having data associated therewith,
determine a presence or an absence of at least one classification tag corresponding to the data associated with the received request, from among the plurality of classification tags provided by the filesystem scanner, and
distribute the data associated with the received request to the storage device or to the cache storage device such that
in response to the absence of the at least one classification tag corresponding to the data associated with the received request being determined, the data associated with the received request are distributed to the storage device, and
in response to the presence of the at least one classification tag corresponding to the data associated with the received request being determined, the data associated with the received request are distributed to the storage device or to the cache storage device in accordance with the at least one classification tag,
wherein the received request having data associated therewith is received without any of the plurality of classification tags provided by the filesystem scanner including the at least one classification tag.

7. The storage system of claim 6,
wherein the mirror structure comprises a block device driver, and
wherein the block device driver is configured to mirror the storage device.

8. The storage system of claim 6,
wherein the mirror structure comprises a filesystem switch, and
wherein the filesystem switch is configured to mount the filesystem of the storage device.

9. The storage system of claim 6,
wherein the mirror structure is further configured to detect a filesystem type of the filesystem of the storage device.

10. The storage system of claim 6,
wherein the mirror structure is further configured to mount the filesystem of the storage device.

11. The storage system of claim 6,
wherein the processor is further configured to run an operating system based on an operating system kernel, and
wherein the operating system kernel is configured to provide the mirror structure.

12. The storage system of claim 6,
wherein the processor is a host processor,
wherein the host processor is configured to operate a host operating system,
wherein the host operating system is configured to provide a virtual machine monitor hosting a virtual machine, and
wherein the received request having data associated therewith is received from the virtual machine.

13. The storage system of claim 6,
wherein the processor is a remote storage processor,
wherein the remote storage processor is configured to communicate with a client system over a communication network, and
wherein the received request having data associated therewith is received from the client system.

14. The storage system of claim 6,
wherein each classification tag of the plurality of classification tags provided by the filesystem scanner defines a specific class, of a plurality of classes, assigned to a particular handling policy.

15. The storage system of claim 6,
wherein the filesystem scanner is configured to update the classification information at a pre-defined time interval.

16. A method of a storage system, the method comprising:
providing a mirror of a filesystem of a storage device;
generating, by a filesystem scanner, classification information including a plurality of classification tags corresponding to data of the filesystem, based on a read of the filesystem via the mirror;
providing, by the filesystem scanner, the plurality of classification tags;
receiving a request having data associated therewith; and
distributing the received request to the storage device or to a cache storage device,
wherein distributing the received request comprises:
determining a presence or an absence of at least one classification tag corresponding to the data associated with the received request, from among the plurality of classification tags provided by the filesystem scanner,
in response to the absence of the at least one classification tag corresponding to the data associated with the received request being determined, distributing the data associated with the received request to the storage device, and
in response to the presence of the at least one classification tag corresponding to the data associated with the received request being determined, distributing the data associated with the received request to the storage device or to the cache storage device in accordance with the at least one classification tag, and wherein receiving the request having data associated therewith comprises:
 receiving the request having data associated therewith without any of the plurality of classification tags provided by the filesystem scanner including the at least one classification tag.

17. The method of claim 16, further comprising:
operating a host operating system;
providing a virtual machine monitor; and
hosting a virtual machine via the virtual machine monitor;
wherein receiving the request having data associated therewith further comprises:
 receiving the request having data associated therewith from the virtual machine.

18. The method of claim 16, further comprising:
communicating with a client system over a communication network;
wherein receiving the request having data associated therewith further comprises:
 receiving the request having data associated therewith from the client system.

* * * * *